Patented Feb. 7, 1939

2,146,224

UNITED STATES PATENT OFFICE 2,146,224

METHOD OF TEMPERING GLASS ARTICLES

Charles John Phillips, Corning, N. Y., assignor to Corning Glass Works, Corning, N. Y., a corporation of New York No Drawing. Application November 11, 1936, Serial No. 110,387

9 Claims. (Cl. 49—89)

This invention relates to the tempering of glass articles by heating them to a predetermined temperature and chilling or quenching them in a liquid bath which is heated to a lower temperature whereby the resistance of the glass article to mechanical and thermal shock is increased.

Although molten inorganic salts, such as chlorides and sulfates, have been proposed as heating baths for the tempering process, such salts may volatilize to some extent and tend to form sludge or scum when used for extended periods of time for this purpose. Many salts when molten have an unfavorable effect on the surface of glass and cause crazing and loss of stability. Insofar as I am aware, chromates have never been used as heating and/or chilling media for the tempering process.

Prior chilling media, such as oils, fats, waxes, resins and the like, are too mild in their chilling action and do not produce as high a degree of tempered strength as the glass will withstand without rupture. The recently proposed chilling media comprising molten alkali nitrate salts or mixtures thereof produce a higher degree of tempered strength than could be obtained by means of prior media, but inhomogeneities in the composition of the glass and the severity of such chilling media have caused considerable breakage of ware under the higher stresses developed thereby.

The primary object of this invention is to temper glass articles with a higher degree of tempered strength than has heretofore been possible.

Another object of the invention is to decrease the cracking and checking of glass articles during the tempering process.

In another application, Serial Number 110,386, filed by me of even date herewith, I have described a method of tempering which includes the use of an improved chilling bath comprising a molten mixture containing an alkali nitrate together with an alkaline earth nitrate or lead nitrate. Such mixture produces a higher degree of temper with less breakage than the alkali nitrate alone.

This invention is directed primarily to the use of an improved tempering medium which finds its chief usefulness as a heating bath, but may also be used as a chilling bath.

Broadly, the invention consists in immersing a glass article to be tempered in a liquid bath containing a molten alkali salt of chromic acid.

In its more specific embodiment, the invention comprises heating a glass article by immersing it in a liquid bath containing a molten alkali salt of chromic acid.

Another specific embodiment comprises chilling a heated glass article in a liquid bath containing a molten alkali chromate heated to a lower temperature than the glass.

The use of molten inorganic salt as a heating and/or chilling medium for the tempering of glass articles depends upon certain considerations. The salt must be relatively cheap and have melting and boiling points outside of the range of temperatures in which it will be used. It must not corrode the container nor craze or check the glass. Furthermore, it should not affect the chemical stability of the glass surface nor form scum after continued use and it should be relatively non-volatile within the useful range of temperatures and relatively soluble in any molten salt which may be used for a chilling medium.

My researches have shown that the alkali salts of chromic acid fulfill the above requirements to better advantage than any salt heretofore used. For example, they are completely stable when heated either alone or in mixture with other salts and do not form scum nor volatilize up to temperatures of 1000° C. or 1100° C. Furthermore, various glasses show no trace of cracking or checking and their surface stability is entirely unimpaired when they are immersed for two minutes therein. In actual practice an immersion of only 20 to 30 seconds is required.

In the following table are shown some of the chromate baths which I have used together with their melting points, the proportions being in mols %.

Heating baths

| No. | Composition | Melting point |
|---|---|---|
| | | °C. |
| A | 50 $K_2CrO_4$ + 50 $Na_2CrO_4$ | 775 |
| B | 32.5 $Na_2CrO_4$ + 67.5 KCl | 525 |
| C | 32.5 $K_2CrO_4$ + 67.5 KCl | 656 |

Chilling baths

| | | |
|---|---|---|
| D | 85 $K_2Cr_2O_7$ + 13 $Na_3CrO_4$ + 2 $K_2O$ | 380 |
| E | 94 $K_2Cr_2O_7$ + 3 $SnO_2$ + 3 $B_2O_3$ | 388 |
| F | 98 $K_2Cr_2O_7$ + 2 $Na_2S$ | 378 |
| G | 95 $K_2Cr_2O_7$ + 5 $Sb_2O_3$ | 385 |
| H | 95 $K_2Cr_2O_7$ + 5 $SnO_2$ | 380 |
| I | 95 $K_2Cr_2O_7$ + 5 $B_2O_3$ | 382 |
| J | 95 $K_2Cr_2O_7$ + 5 PbO | 387 |
| K | 95 $K_2Cr_2O_7$ + 5 $CuSO_4$ | 378 |
| L | 98 $KNO_3$ + 2 $K_2CrO_4$ | 295 |

It will be noted that composition D contains $K_2O$ and composition E contains $B_2O_3$. These ingredients are introduced into the batch preferably as $K_2CO_3$ and $H_3BO_3$ respectively, which on being melted and heated sufficiently are converted at least to a large extent to the oxides through evolution of $CO_2$ and $H_2O$.

Composition L is essentially the alkali nitrate bath of the prior art modified by the addition of 2% potassium dichromate. Such addition has the effect of lowering the melting point of the nitrate bath and increasing the amount of chill or maximum tension which can be obtained therewith.

In practicing my invention in accordance with the known method of heating and chilling glass articles by means of liquid baths, the heating bath composition is melted and held at a temperature near or above the softening point of the glass. The chilling bath composition is likewise melted and held at a temperature below that of the heating bath, depending upon the size and shape of the article to be tempered, the composition of the glass of which it is composed and the degree of temper desired. The glass article which is to be tempered is immersed in the heating bath for about twenty to thirty seconds or for a length of time sufficient to raise the temperature of the interior of the glass to a temperature between its strain point and its softening point, after which the article is removed from the heating bath and immediately immersed in the chilling bath.

Since the bath temperatures will depend upon the size, shape and composition of the articles being treated, it is impossible to state the exact conditions necessary for all glasses, but they may readily be determined for any particular kind of ware. For example, a slab of the glass $B_2$ of the Sullivan and Taylor Patent 1,304,623, when heated for sixty seconds in bath A, which is held at a temperature of 800° C. and then quenched in a bath composed of an eutectic mixture of potassium nitrate and sodium nitrite which is held at a temperature of 300° C., will have a maximum tension of 2.0 kg. per square mm. With glasses of higher softening points, higher temperatures are employed in the heating bath and it becomes more advantageous to use one of the above recited chilling baths instead of an alkali nitrate bath. This is because the prior nitrate bath is too severe unless its temperature be raised and in the latter event volatilization becomes a detriment.

I claim:

1. The method of tempering a glass article which consists in heating it until its interior is at a temperature between the strain point and the softening point of the glass and thereafter suddenly chilling it, at least one step of the method comprising immersing it in a liquid bath containing a molten alkali salt of chromic acid.

2. The method of tempering a glass article, which includes immersing it in a heated liquid bath containing a molten alkali salt of chromic acid until its interior is heated to a temperature between the strain point and the softening point of the glass and thereafter chilling it.

3. The method of tempering a glass article, which includes immersing it in a heated liquid bath containing a molten alkali salt of chromic acid until its interior is heated to a temperature between the strain point and the softening point of the glass and chilling it in a liquid bath containing a molten inorganic salt.

4. The method of tempering a glass article, which includes immersing it in a heated liquid bath containing a molten alkali salt of chromic acid until its interior is heated to a temperature between the strain point and the softening point of the glass, and chilling it in another bath containing a molten alkali salt of chromic acid heated to a lower temperature than the first bath.

5. The method of tempering a glass article, which includes immersing it in a heated liquid bath containing a molten alkali salt of chromic acid and a molten alkali chloride until its interior is heated to a temperature between the strain point and the softening point of the glass and chilling it in a liquid bath containing a molten inorganic salt.

6. The method of tempering a glass article, which includes immersing it in a mixture of molten salts comprising 32.5 mols % $Na_2CrO_4$ and 67.5 mols % $KCl$ until its interior is heated to a temperature between the strain point and the softening point of the glass, and chilling it in a liquid bath containing a molten inorganic salt.

7. The method of tempering a glass article, which includes immersing it in a mixture of molten salts comprising 50 mols % $K_2CrO_4$ and 50 mols % $Na_2CrO_4$ until its interior is heated to a temperature between the strain point and the softening point of the glass and chilling it in a liquid bath containing a molten inorganic salt.

8. The method of tempering a glass article, which includes heating it until its interior is at a temperature between the strain point and the softening point of the glass, and chilling it in a liquid bath containing a molten alkali salt of chromic acid.

9. The method of tempering a glass article, which includes heating it until its interior is at a temperature between the strain point and the softening point of the glass, and chilling it in a mixture of molten salts comprising 98 mols % $KNO_3$ and 2 mols % $K_2Cr_2O_7$.

CHARLES JOHN PHILLIPS.